US011075756B2

(12) United States Patent
Beunardeau et al.

(10) Patent No.: US 11,075,756 B2
(45) Date of Patent: Jul. 27, 2021

(54) METHOD OF ENCRYPTION, METHOD OF DECRYPTION, CORRESPONDING COMPUTER DEVICE AND PROGRAM

(71) Applicant: INGENICO GROUP, Paris (FR)

(72) Inventors: Marc Beunardeau, Paris (FR); Remi Geraud, Valence (FR); David Naccache, Paris (FR); Aisling Connolly, Paris (FR)

(73) Assignee: INGENICO GROUP, Paris (FR)

( * ) Notice: Subject to any disclaimer, the term of this patent is extended or adjusted under 35 U.S.C. 154(b) by 196 days.

(21) Appl. No.: 16/341,281

(22) PCT Filed: Oct. 12, 2017

(86) PCT No.: PCT/EP2017/076109
§ 371 (c)(1),
(2) Date: Apr. 11, 2019

(87) PCT Pub. No.: WO2018/069465
PCT Pub. Date: Apr. 19, 2018

(65) Prior Publication Data
US 2020/0169403 A1    May 28, 2020

(30) Foreign Application Priority Data

Oct. 12, 2016  (FR) ........................ 1659871

(51) Int. Cl.
*H04L 9/30* (2006.01)
*H04L 9/00* (2006.01)
*H04L 29/06* (2006.01)

(52) U.S. Cl.
CPC ............ *H04L 9/3013* (2013.01); *H04L 9/002* (2013.01); *H04L 63/0428* (2013.01)

(58) Field of Classification Search
CPC combination set(s) only.
See application file for complete search history.

(56) References Cited

U.S. PATENT DOCUMENTS 8,127,130 B2 * 2/2012 Ellis ...................... H04L 9/0662
                                                       713/151
8,605,895 B2 * 12/2013 Ramachandran ....... H04L 9/302
                                                          380/30

(Continued)

FOREIGN PATENT DOCUMENTS

EP     2378707 A1    10/2011

OTHER PUBLICATIONS

English translation of the Written Opinion dated May 22, 2019 for corresponding International Application No. PCT/EP2017/076109, filed Oct. 12, 2017.

(Continued)

*Primary Examiner* — Christopher A Revak
(74) *Attorney, Agent, or Firm* — David D. Brush; Westman, Champlin & Koehler, P.A.

(57) ABSTRACT

A method of encryption of a message implemented by an electronic encryption device. The method includes: obtaining a current message; obtaining a current encryption key; determining, from a plurality of variants a basic encryption protocol, of a current variant of the encryption protocol; encrypting, by using the current variant and the encryption key, the message to be encrypted, delivering an encrypted message; and transmitting the encrypted key.

7 Claims, 2 Drawing Sheets

(56) References Cited

U.S. PATENT DOCUMENTS

Figure 1:
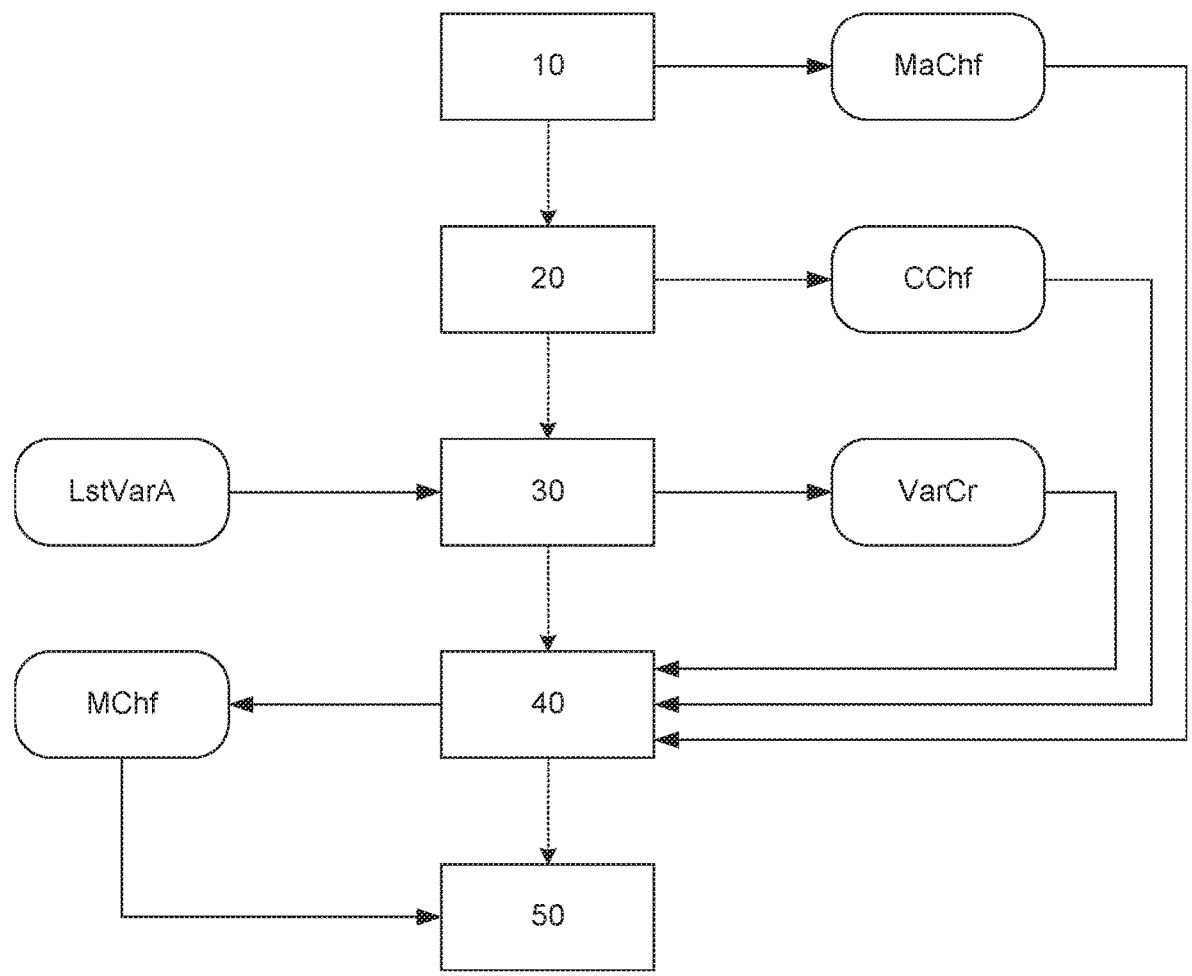

| | | | |
|---|---|---|---|
| 9,047,445 B2* | 6/2015 | Lin | G06F 21/445 |
| 9,923,923 B1* | 3/2018 | Sharifi Mehr | H04L 9/14 |
| 2011/0213982 A1 | 9/2011 | Brown | |

OTHER PUBLICATIONS

International Search Report dated Oct. 24, 2017 for corresponding International Application No. PCT/EP2017/076109, filed Oct. 12, 2017.

Elgamal T., "A Public Key Cryptosystem and a Signature Scheme Based on Discrete Logarithms", IEEE Transactions on Information Theory, IEEE Press, USA, vol. 31, No. 4, Jul. 31, 1984 (Jul. 31, 1985), pp. 469-472, XP000565224.

* cited by examiner

METHOD OF ENCRYPTION, METHOD OF DECRYPTION, CORRESPONDING COMPUTER DEVICE AND PROGRAM

CROSS-REFERENCE TO RELATED APPLICATIONS

This Application is a Section 371 National Stage Application of International Application No. PCT/EP2017/076109, filed Oct. 12, 2017, which is incorporated by reference in its entirety and published as WO 2018/069465 A1 on Apr. 19, 2018, not in English.

1. FIELD OF THE INVENTION

The invention relates to the field of the processing of confidential data. The proposed technique relates more specifically to the encryption of data and the decryption of this encrypted data.

2. PRIOR ART

The transmission and reception of data with full security presents numerous difficulties. These are difficulties related both to the way in which the data are made confidential and to the channels by which the data are transmitted. At present, there are many solutions to secure data before they are transmitted, using especially methods of data encryption that rely on the use of encryption keys and can be divided into symmetrical encryption methods and asymmetrical encryption methods.

A method of symmetrical encryption relies on the sharing of a key that is called a shared key and that enables both the encryption and the decryption of the data. When two users share an encryption key of this kind, one of the (major) problems is to make sure that neither of the two users disseminates (whether accidentally or not) the shared key: otherwise, the encryption of data by means of this key does not serve any great purpose. A malicious person, in this example, would try to obtain the key shared between users in order to have access to the data.

A method of asymmetrical encryption, far more robust, comprises the implementation, for each user, of a unique {private key, public key} pair. The user can share his public key with anyone whatsoever and keep his private key. When a first user wishes to transmit a piece of data in encrypted form to a second user, the first user encrypts the piece of data with the public key of the second user and transmits it. The second user receives this encrypted piece of data and decrypts with his private key which is the only key capable of decrypting the received piece of data. Thus, this method is far more secured than a sharing of keys. A malicious person in this example would therefore try to obtain the private key from a user in order to have access to data.

For a malicious person, therefore, the problem is the efficient implementation of the above-mentioned encryption methods. To overcome the difficulties posed by efficient encryption of data before they are transmitted, malicious persons have therefore developed novel forms of attack. These include especially side-channel attacks and fault-injection attacks. In side-channel attacks, the value of a key (for example a private key) is deduced from a certain number of clues. Such a type of attack is generally possible when the attacker has physical access to the device that is using the key. Side-channel attacks reveal information on the cryptographic computation itself, namely the signature procedure as executed. Such attacks have been demonstrated in various real-life contexts. The side channels to which reference is often made comprise for example information about computation time, electrical consumption and electromagnetic transmission. Using this information, the attacker can deduce a certain number of parameters that play a role in encryption, and especially certain elements of the key used.

A malicious person can also force a device to reveal information by injecting faults into the apparatus. By cleverly applying disturbances in the execution of the algorithm, much information on the key can be retrieved. This is known as a fault-injection attack.

From the harvested data, the attacker can then either directly deduce the value of the key or substantially reduce the number of potential keys and test each of the existing potential keys until the key being sought is obtained.

Now, there are few flexible, simple and efficient methods to prevent such attacks. One costly method consists in providing the device with hardware protection measures, preventing it from being spied upon by an attacker. Such a solution is costly and is not necessarily efficient since novel forms of obtaining data can appear after the device has been created. Another solution, which is resource-hungry, consists in changing the key at each use but this requires major resources both in the device, which must generate a key at each exchange, and for the devices with which it exchanges the encrypted data, which must also do the same.

There is therefore a need to provide a solution that is resistant to side-channel attacks and fault-injection attacks while ensuring easy implementation at reduced cost.

3. SUMMARY

The invention does not pose these problems of the prior art. More particularly, the invention provides a simple solution to the problem identified above. Indeed, the present technique offers an increased level of securing, during encryption, of the transmission and decryption of data, and does so without requiring extensive computations both on the part of the device that carries out the encryption of the data to be transmitted and on the part of the device that receives the data and encrypts them.

More particularly, the present technique relates to a method of encryption of a message implemented by an electronic encryption device. Such a method comprises:
  a step for obtaining a current message;
  a step for obtaining a current encryption key;
  a step for the determining, from a plurality of variants of a basic encryption protocol, of
  a current variant of said encryption protocol;
  a step of encryption, by means of said current variant and said encryption key, of said messages to be encrypted delivering an encrypted message;
  a step of transmission of said encrypted key.

Thus, the attacker cannot base his action on known data, at a given point in time, to build future attacks. In a manner appreciably equivalent to the methods for changing the encryption key at each exchange, the method of encryption proposes to change the encryption method at each exchange. The key point is that this method is modified not completely but only sufficiently so to make any attack inoperable.

According to one particular characteristic, the method further comprises a step of transmission of at least one piece of data representing said current variant of said encryption protocol.

Thus, the receiver device is capable of determining the variant that has been used to encrypt the message. Using this information, the receiver device is then capable of carrying out a decryption of the message.

According to one particular characteristic, said basic encryption protocol is the ElGamal protocol represented by the equation:

$$m=xr+ks \pmod{p-1}$$

an equation wherein:
m is the current message;
x is the current encryption key;
s is the encrypted message;
k is a random number;
r=alpha^k (mod p) where alpha is a generator of Z_p and Z_p is a ring of relative integers modulo p where p is a prime number.

According to one particular embodiment, the step for determining a variant of the basic encryption protocol comprises:
  a step for obtaining at least one variation index of at least one parameter of the encryption protocol;
  a step for assigning a value, by means of said at least one variation index, to said at least one parameter of variation of said encryption protocol, delivering said current variant.

Thus, depending on one or more variation indices, it is possible to generate an encryption variant. The choice of the value of the variation indices therefore enables efficient management of the use of the different variants of the encryption protocol.

According to one particular characteristic, said at least one index of variation is a random number.

Thus, it is ensured that the variants are used randomly and that these random values substantially increase the efforts to be made (on the part of an attacker) to access encrypted data or even make such access impossible.

According to one particular characteristic, said at least one variation index, used for the encryption of the current message, is different from a variation index used for the encryption of the preceding message.

Thus, it is ensured that a given variant cannot be used twice in succession for the encryption of two consecutive messages.

According to one particular embodiment, said at least one parameter of variation of said encryption protocol belongs to the group comprising:
  a variation of the size of at least one variable;
  a variation of the position of at least one variable;
  a variation of a type of equation;
  a variation of a sign of at least one variable;
  an adjoining of at least one additional function.

According to another aspect, the present invention also relates to an electronic device for the encryption of a message, for the implementation of the method presented here above. Such a device comprises:
  means for obtaining a current message;
  means for obtaining a current encryption key;
  means for determining, from among a plurality of variants of a basic encryption protocol, of a current variant of said encryption protocol;
  means of encryption, by means of said current variant and said encryption key, of said messages to be encrypted, delivering an encrypted message;
  means of transmission of said encrypted key.

According to a preferred implementation, the different steps of the methods according to the invention are implemented by one or more software programs or computer programs comprising software instructions that are to be executed by a data processor of a relay module according to the invention, these programs being designed to control the execution of different steps of the methods.

The invention is therefore also aimed at providing a program capable of being executed by a computer or by a data processor, this program comprising instructions to command the execution of the steps of a method as mentioned here above.

This program can use any programming language whatsoever and can be in the form of source code, object code or intermediate code between source code and object code such as in a partially compiled form or in any other desirable form whatsoever.

The invention is also aimed at providing an information carrier or medium readable by a data processor, and comprising instructions of a program as mentioned here above.

The information medium can be any entity or communications terminal whatsoever capable of storing the program. For example, the medium can comprise a storage means such as a ROM, for example, a CD ROM or microelectronic circuit ROM or again a magnetic recording means, for example a floppy disk or a hard disk drive.

Besides, the information support can be a transmissible support such as an electrical of optical signal, that can be conveyed by an element or optical cable, by radio or by other means. The program according to the invention can be especially downloaded from an Internet type network.

As an alternative, the information carrier can be an integrated circuit into which the program is incorporated, the circuit being adapted to execute or to be used in the execution of the method in question.

According to one embodiment, the proposed technique is implemented by means of software and/or hardware components. In this respect, the term "module" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions according to what is described here below for the module concerned. Such a software component is executed by a data processor of a physical entity (terminal, server, gateway, router etc) and is capable of accessing the hardware resources of this physical entity (memories, recording media, communications buses, input/output electronic boards, user interfaces etc).

In the same way, a hardware component corresponds to any element of a hardware assembly capable of implementing a function or a set of functions according to what is described here below for the component concerned. It can be a programmable hardware component or a component with an integrated processor for the execution of software, for example, an integrated circuit, smart card, a memory card, an electronic board for the execution of firmware etc.

Each component of the system described here above can of course implement its own software components.

The different embodiments mentioned here above can be combined with one another to implement the proposed technique.

4. DRAWINGS

Figure 2:
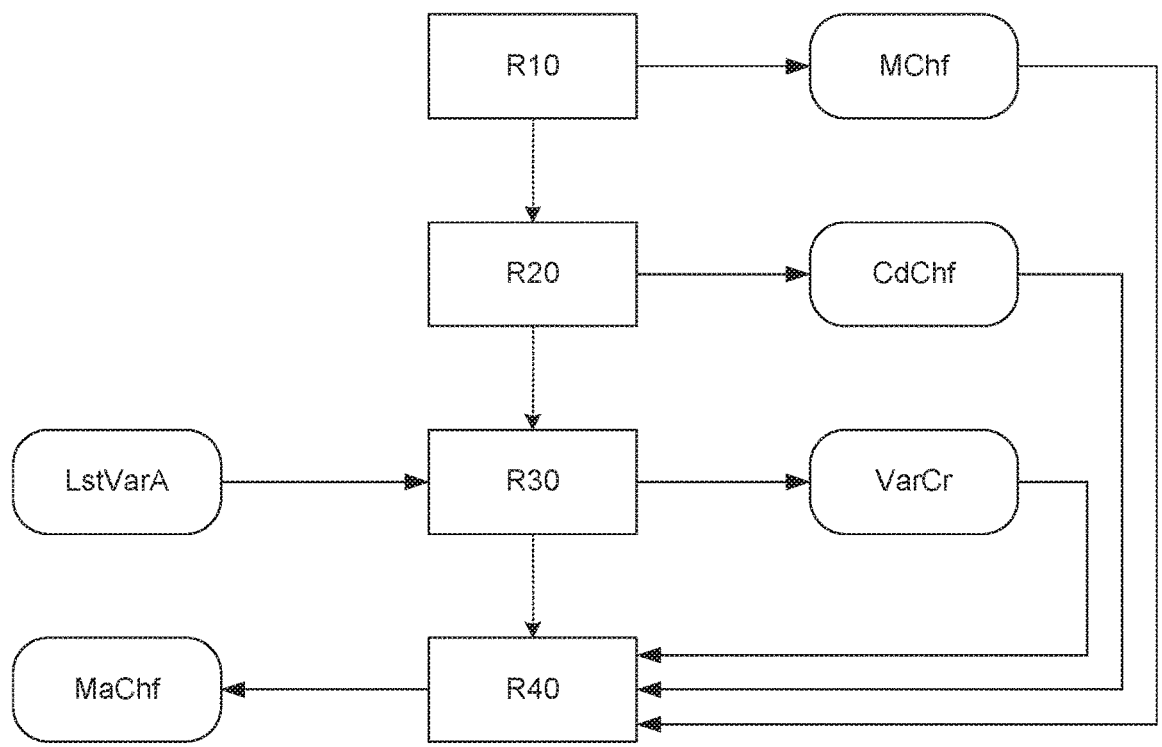
Figure 3:
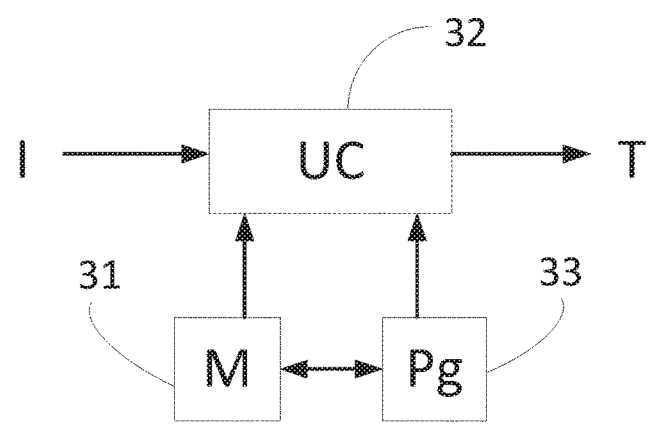

Other features and advantages of the invention shall appear more clearly from the following description of a preferred embodiment, given by way of a simple illustrative and non-exhaustive example and from the appended drawings, of which:

FIG. 1 proposes a block diagram of the proposed technique for the encryption of a message;

FIG. 2 presents the reception of an encrypted message by a decryption device;

FIG. 3 describes an encryption device according to one particular embodiment.

5. DESCRIPTION

5.1. General Principle

The general principle of the invention consists in carrying out a particular processing operation within the encryption device. This particular encryption operation comprises especially a step for obtaining a variant of a basic encryption algorithm, said variant being deduced from a nominal version of this basic encryption algorithm. The encryption of data is done by using the selected variant and the pieces of encrypted data are then transmitted to the intended recipient.

This means that an attacker who possesses physical access to the device and wishes to observe the modifications made in this device during the encryption operation will observe, at each execution of an encryption operation, a behavior different from the previously observed behavior. This results in additional difficulty for the attacker in interpreting the data obtained by observing the behavior of the device. Besides, even by collecting a large number of pieces of observation data on the behavior of the device, the attacker is not capable of inferring sufficiently relevant observations to obtain the encryption key. This is especially true when the encryption algorithm is accurately chosen, i.e. when the encryption algorithm comprises a large number of variants. Indeed, the two techniques of attack described here above (fault-injection and side-channel attacks require the attacker to know and adapt his attacks to the implementing of the encryption algorithm and requires knowledge of the algorithm used. Except in rare cases of lack of security, even with in-depth knowledge of implementation, a physical attack must be repeated several times in order to succeed. For side-channel attacks, this repetition enables the attacker to filter out the noise and acquire knowledge on the very subtle variations, for example of consumption of current, that may be linked to operations of the device and to the key being processed. For fault-injection attacks, the repetition must be used to guess the right parameters to obtain the desired error.

With the invention, the obtaining of relevant parameters or information becomes very complicated. Indeed, since the encryption process varies from one instance to the next, it is not easy and it is may be impossible to deduce a parameter because the repetition of attempts to obtain parameters does not make it possible to obtain consistent information inasmuch as each implementation of the encryption protocol is slightly different from the previous implementation.

It can be noted that, according to the invention and unlike existing solutions to the problem posed, the invention does not involve adding or modifying false data-processing operations in the implementation of the algorithm. Indeed, algorithm-modification solutions are known and are aimed at countering side-channel attacks. These known solutions often implement a given encryption algorithm to which, during execution, fictitious commands are added with the goal of scrambling the data obtained by the attacker. These fictitious commands are generally unnecessary in the encryption processing operation. According to the invention, on the contrary, it is truly variants that are used, i.e. the operations carried out are useful for the encryption process. Thus, the invention avoids excess consumption of resources and energy that would be detrimental to the autonomy or storage (in secured memory) of the device. Since the present technique is based on the implementation of only one algorithm, there is no need to have several implementations of this algorithm. A single implementation is needed and sufficient. Thus, the quantity of space available to store this implementation (in a secured way) within the device is reduced and the risks related to numerous implementations are also reduced (these risks essentially take the form of errors of encoding or of implementation that drastically lower performance in terms of security).

According to the invention, in one particular embodiment, the basic encryption algorithm used is the ElGamal algorithm, applied as it should be in an asymmetrical cryptosystem (comprising a private key and a public key).

In general, presented with reference to FIG. 1, the method of the invention comprises the following in the encryption device:
- a step for obtaining (10) a current message (MaChf);
- a step for obtaining (20) a current encryption key (CChf);
- a step for determining (30), from among a plurality of variants (LstVarA) of an encryption algorithm, a current variation (VarCr) of said encryption algorithm used;
- a step of encryption (40), by means of said current variant (VarCr) and of said encryption key (CChf), of said message to be encrypted (MaChf), delivering an encrypted message (MChf);
- a step of transmission (50) of said encrypted key (MChf).

The encrypted message (MChf) is then transmitted to its intended recipient. This transmission is done by any appropriate means, whether by means of a wireless communications network or directly by means of a hardware interface (for example a transmission made by a smart card to a smart-card reader terminal) or a wireless interface (for example in the case of NFC, Zigbee and other types of transmission).

The decryption for its part implements the following method:
- a step of reception (R10) of said encrypted message (MChf);
- a step for obtaining (R20) a current decryption key (CdChf);
- a step of determining (R30), from among a plurality of variants (LstVarA) of an encryption algorithm, of a current variant (VarCr) of said encryption algorithm used;
- a step of decryption (R40) by means of said current variant (VarCr) and of said decryption key (CdChf), of said encrypted message (MChf), delivering a current message (MaChf).

Embodiments of the invention emphasize the way in which the selection of the variant is done by the encryption device and the way in which the decryption device obtains knowledge of these variants.

In a first embodiment, the step for determining the current variant comprises:
- a step for obtaining a variation index, this variation index being different from the one obtained in a previous execution of the encryption method;
- a step of searching, within a list of parameters, by means of the variation index, for a set of variant parameters, called parameters of the current variant;

a step for copying out parameters of the current variant in a specific location of the secured memory of said device.

The step of encryption, for its part, comprises:

a step for instantiating the current variant of the encryption protocol by means of parameters of the current variant, previously copied out into the secured memory of said device;

a step of encryption of the message by means of the current instance of the encryption protocol.

The step of transmission of the encrypted message is accompanied for its part by a transmission of a piece of data representing the variation index. The variation index can be attached to the encrypted message as a prefix or as a postfix and can thus enable a unique transmission. The transmission of the variation index at the same time as the encrypted message can seem to run counter to the increasing of the degree of security put forward in the present invention: this is not at all the case. Indeed, if we assume that the attacker is in full possession of the encryption device and is fully capable of observing exchanges, he will have the variation index used at his disposal. However, when the number of variants is sufficiently great, the number needed for attempts at penetration (fault injection) and/or observation of side channels is multiplied by the number of possible variants. Now, although they are possible, side-channel attacks or fault-injection attacks are very lengthy to implement and this is the case even when only one algorithm is used. Thus, the attacker's knowledge of the variant used for the encryption ultimately does not bring much additional information to the attacker. Besides, instead of the index variation, it is also possible to directly transmit the parameters that constitute the variant, one after the other. Such a possibility is worthwhile when the decryption device does not have the list of parameters in a table, as is the case for the encryption device. In this embodiment, the decryption device has only the variant algorithm, but not the variation parameters, and it is therefore necessary to transmit these parameters to him.

Naturally, in one specific embodiment which is more secured, it is possible not to transmit the variation index (in clear-text form) at the same time as the encrypted message. Several possibilities are proposed according to the invention.

A first possibility consists of the encryption of the variation index by using the basic version of the encryption protocol (variation index 0). Thus, the current variation index is encrypted and then transmitted in encrypted form. The advantage of this solution is that it is simple to implement and does not require specific hardware on the part of the encryption device. Besides, if the variation index 0 of the list of parameters is considered to refer to the basic version of the encryption protocol (i.e. it is not a variant), then there is an additional advantage in encrypting the variation index before transmitting it: the attacker will indeed see two successive executions of the encryption, the nature of which is substantially identical: he will see one execution for the encryption of the variation index and one execution for the encryption of the message. A complexity of analysis will therefore be added to the results obtained by the attacker.

A second possibility is not to transmit the variation index at all. In this way, the attacker has no information on the variant used. The question arises however on the way in which the reception device obtains knowledge of the variant used to encrypt the message. To overcome this problem, a technique of pre-negotiation is implemented during which the encryption device and the decryption device exchange not a variation index but a variation index generator. A variation index generator takes the form of a pseudo-random function and a parameter. This pseudo-random function and this parameter are chosen by the encryption device and then encrypted by means of the basic version of the algorithm. They are then transmitted in encrypted form to the decryption device which decrypts the entire information. This pseudo-random function and this parameter are chosen in such a way that, both on the encryption device and on the decryption device, they generate an identical number. This function and this parameter are therefore used by the encryption device to generate the first variation index of the variant that is used to encrypt the message to be transmitted. Upon reception of the encrypted message, the decryption device carries out the same processing as the encryption device. The variation index used by the encryption device is obtained and the decryption is done by using the variant whose parameters are obtained by this variation index. The variation index obtained, both from the encryption device and from the decryption device, is then used as a parameter for the random function during the encryption/decryption of the next message.

The advantage of this embodiment is that it is not necessary to encrypt the variation index at each transmission of a message. A single preliminary exchange is then used to carry out a "synchronization" of the encryption device and of the decryption device. The variation index obtained for a first message is used as a parameter to compute a following variation index, which ensures high consistency in the management of the variation indices.

It is noted besides that, even if the variation index should be transmitted in clear-text form by the encryption device (i.e. the general case), the generation of the variation index by the encryption device can advantageously follow the method described here above, namely the use of a pseudo-random function and a starting parameter, the variation index obtained serving as a parameter for the generation of the next variation index.

Here above, for greater simplicity, it has been considered that there is only one variation index used to uniquely identify a variant of the encryption protocol (within a list for example). Naturally, this is one example and, in the present embodiment presented here below, several variation indices are used, each relating to a different variation of the encryption protocol. It is thus possible to transmit several variation indices, each index relating to a given variation. In this case, the indices are managed according to the previous presentation.

In the context of the present invention, it is also specified that an encryption device can take the form of any device whatsoever. It can for example be a smartphone type of communications terminal, a payment terminal, a computer, a bankcard having a microprocessor. This is also the case for the decryption device which can take the form of any device whatsoever. It can for example be a smartphone-type communications terminal, a payment terminal, a computer, a bankcard having a microprocessor. Besides, a device, during exchanges with another device, can play the role of the encryption device and that of the decryption device in alternation as and when the messages are exchanged.

5.2. Description of One Embodiment

The general principle has been described on the basis of a use of a general algorithm comprising a certain number of variants. In this embodiment, we describe the application of this general principle to the ElGamal protocol.

The ElGamal protocol comprises a certain number of known variants, for example the Schnorr variants, the "Digital signature algorithm" (DSA) or again the "Cramer-shoup" system. The original ElGamal protocol can be described by the following equation:

$$m = xr + ks \pmod{p-1} \quad (1)$$

an equation in which:
m is the message;
x is a secret key;
s is the signature;
k is a nonce (randomly generated and used only once);
r=alpha^k (mod p) (alpha to the power of k where alpha is a generator of Z_p, rings of relative integers modulo p where p is a prime number).

Such an equation enables the defining of both the signature (the encryption) made on the message and m, and the verification of the signature (or of the encrypted message).

The possible variants of the ElGamal protocol can be articulated around variations of a certain number of types of parameters. These types of parameters and these variations are:

i. Size

It is possible to obtain variation in the size of p and it is possible to shorten the signature by computing it modulo (mod) q instead of modulo (mod) p−1, with q being a divider of p−1.

ii. Exchange of the Variables m,r,s

It is possible to modify the places of the variables m,r,s in the original equation and to do so without losing any level of security. For example, the following equation produces results that are equivalent to the previous equation:

$$r = xm + ks \pmod{p-1} \quad (2)$$

iii. Type of Equation

It is also possible to "group" variables. For example, a "grouping" of variables m,r,s (by multiplying them) leads to the following equation:

$$mr = xs + k \pmod{p-1} \quad (3)$$

iv. Signs

It is possible to invert the signs of the values of the variables. It is for example possible to multiply the values of the variables m, r, or s by −1.

v. Choice of Functions f and g

It is also possible to select additional functions that comply with predefined properties. It is possible for example to choose two additional functions f and g such that:

$$f(m,r) = rg(m,s) + k \pmod{p-1} \quad (4)$$

f org can for example also be the bit by bit equivalence of the bit by bit xor function.

The various variations presented here above are clearly combinable with each other. Thus it is possible to exchange the variables while multiplying their value by −1 and by selecting one or two additional functions.

By combining these variations it is possible for example to have an equation of the following type:

$$r \leftrightarrow s = x(m \text{ xor } s) - k (\bmod (p-1)/2) \quad (5)$$

This equation is quite equivalent to the equation (1) (2) (3) or (4) in terms of results obtained.

Depending on the implementations, naturally, the equations obtained can (or may not) enable an inversion of the result. This means that, for certain of these equations, the transmission of the message in clear-text form is necessary, the equation itself being used to generate a signature of the message (a signature that is itself verified by the receiver device). Other equations are reversible and require only the transmission of the encrypted message.

In this embodiment, a variant is described by a choice of parameters. By analogy, a choice of variants amounts to defining a table (the table that will be used), comprising the set of "modifiable" parameters in one variant and to specifying the row and column of this table. Thus, a variant consists of a selection of a scheduling of the variables m, r, s (ii.), then a selection of signs for these variables (iii.). Once these selections are made, a function takes as arguments two indices which give, for example, according to the established order m, s, r and −, −, + and generates the equation −m=−xs+kr.

Thus, the embodiment is simple since the tables to be maintained are small (there are few choices at each step). It is therefore not necessary to have available an algorithm that is adapted to each variant. Returning to the previous example, it is necessary and sufficient to have available the bricks needed to implement each variation (choice of order, choice of signs, etc.) to have the available corresponding implementation of the algorithm.

As explained here above, there are several possibilities for this. Either there is a predefined list available, in which a major number of variants is parametrized, and a variant is selected randomly from this list. This embodiment has the advantage of not requiring a large number of operations during the choice of a variant. Conversely, it is possible to have a larger number of lists available, each of these lists being applied to one type of variation (size, exchange, type, sign) and the list applied being selected randomly from among these types of variation.

5.3. Other Characteristics and Advantages

Referring to FIG. 3, we describe an encryption device implemented to locally generate variants encryption protocol, according to the method described here above.

For example, the encryption device comprises a memory 31 comprising for example a buffer memory, a general processor 32, equipped for example with a microprocessor and controlled by a computer program 33 and/or a secured memory 34, a secured processor 35 controlled by a computer program 36, these processing units implementing data-processing methods such as described here above to carry out encryption processing operations that are parameterized as a function of the selection of a variant of execution of the encryption protocol.

At initialization, the code instructions of the computer program 36 are for example loaded into a memory and then executed by the secured processor 35. The processor 35 inputs at least one piece of data representing a message or a piece of data representing an encryption key. The secured processor 35 implements the steps of the encryption method according to the instructions of the computer program 36 to select a variant of an encryption protocol and encrypt the message by means of this variant and the encryption key and transmit this encrypted message to its intended recipient.

To this end, the encryption device comprises, in addition to the memory 34, communications means such as network communications modules, data-transmission means and data-transmission circuits for transmission between the different components of the encryption device.

The means described here above can take the form of a particular processor implemented within a terminal such as a payment terminal. According to one particular embodiment, the encryption device implements a particular application that is in charge of carrying out the operations described here above, this application being for example given by the manufacturer of the processor in question in order to enable the use of said processor. To this end, the processor comprises unique identification means. These unique identification means ensure the authenticity of the processor.

The decryption device has not been shown. It is presented essentially in the same way as the encryption device and comprises identical or equivalent means enabling, on the one hand, the determining of a variant of an encryption protocol and, on the other hand, the decryption of the messages as a function of a variant of encryption protocol (and therefore decryption protocol) used.

The invention claimed is:

1. A method of encryption of a message implemented by an electronic encryption device, wherein the method comprises:
   obtaining a current message;
   obtaining a current encryption key;
   determining, from a plurality of variants of a basic encryption protocol, a current variant of said basic encryption protocol;
   encrypting, by using said current variant and said encryption key, said message to be encrypted, delivering an encrypted message; and
   transmitting said encrypted message,
   wherein said determining a current variant of the encryption protocol comprises:
      obtaining at least one variation index of at least one parameter of the encryption protocol; and
      assigning a value, by using said at least one variation index, to said at least on parameter of said basic encryption protocol, delivering said current variant,
   and wherein said at least one parameter of said encryption protocol comprises: a variation of a size of at least one variable, a variation of a position of at least one variable, a variation of a type of equation, a variation of a sign of at least one variable, or an adjoining of at least one additional function.

2. The method of encryption according to claim 1, further comprising transmitting at least one piece of data representing said current variant of said encryption protocol.

3. The method of encryption according to claim 1, wherein said basic encryption protocol is the ElGamal protocol represented by the equation:

$$m = xr + ks \pmod{p-1}$$

an equation wherein:
   m is the current message;
   x is the current encryption key;
   s is the encrypted message;
   k is a random number;
   $r = alpha\hat{\ }k \pmod{p}$ where alpha is a generator of $Z\_p$ and $Z\_p$ is a ring of relative integers modulo p where p is a prime number.

4. The method of encryption according to claim 1, wherein said at least one index of variation is a random number.

5. The method of encryption according to claim 1, wherein said at least one variation index, used for the encryption of the current message, is different from a variation index used for the encryption of the preceding message.

6. An electronic device for encryption of a message, wherein the electronic device comprises:
   a processor; and
   a non-transitory computer-readable medium comprising instructions stored thereon, which when executed by the processor configure the electronic device to perform acts comprising:
   obtaining a current message;
   obtaining a current encryption key;
   determining, from among a plurality of variants of a basic encryption protocol, a current variant of said basic encryption protocol;
   encrypting, by using said current variant and said encryption key, said message to be encrypted, delivering an encrypted message; and
   transmitting said encrypted message,
   wherein said determining a current variant of the basic encryption protocol comprises:
      obtaining at least one variation index of at least one parameter of the basic encryption protocol; and
      assigning a value, by using said at least one variation index, to said at last one parameter of said basic encryption protocol, delivering said current variant,
   and wherein said at least one parameter of said encryption protocol comprises: a variation of a size of at least one variable, a variation of a position of at least one variable, a variation of a type of equation, a variation of a sign of at least one variable, or an adjoining of at least one additional function.

7. A non-transitory computer-readable medium comprising a computer program product stored thereon, which comprises program code instructions for executing a method of encryption, when the instructions executed by a processor of an electronic device, wherein the instructions configure the electronic device to perform acts comprising:
   obtaining a current message;
   obtaining a current encryption key;
   determining, from a plurality of variants of a basic encryption protocol, a current variant of said basic encryption protocol;
   encrypting, by using said current variant and said encryption key, said message to be encrypted, delivering an encrypted message; and
   transmitting said encrypted message,
   wherein said determining a current variant of the basic encryption protocol comprises:
      obtaining at least one variation index of at least one parameter of the basic encryption protocol; and
      assigning a value, by using said at least one variation index, to said at least one parameter of said basic encryption protocol, delivering said current variant,
   and wherein said at least one parameter of said encryption protocol comprises: a variation of a size of at least one variable, a variation of a position of at last one variable, a variation of a type of equation, a variation of a sign of at least one variable, or an adjoining of at least one additional function.

* * * * *